United States Patent
Ramamurthi et al.

(10) Patent No.: US 9,025,537 B2
(45) Date of Patent: May 5, 2015

(54) INTER-CELL INTERFERENCE MITIGATION USING LIMITED FEEDBACK IN CELLULAR NETWORKS

(75) Inventors: Bhaskar Ramamurthi, Chennai (IN); Joseph Vinosh Babu James, Chennai (IN)

(73) Assignee: Centre of Excellence in Wireless Technology, Chennai (IN)

( * ) Notice: Subject to any disclaimer, the term of this patent is extended or adjusted under 35 U.S.C. 154(b) by 593 days.

(21) Appl. No.: 12/867,461

(22) PCT Filed: Feb. 6, 2009

(86) PCT No.: PCT/IN2009/000084
§ 371 (c)(1),
(2), (4) Date: Aug. 16, 2010

(87) PCT Pub. No.: WO2009/113100
PCT Pub. Date: Sep. 17, 2009

(65) Prior Publication Data
US 2010/0315970 A1    Dec. 16, 2010

(30) Foreign Application Priority Data
Feb. 12, 2008   (IN) .............................. 355/CHE/2008

(51) Int. Cl.
*H04W 4/00* (2009.01)
*H04B 7/06* (2006.01)
*H04W 72/08* (2009.01)

(52) U.S. Cl.
CPC ............. *H04B 7/0619* (2013.01); *H04W 72/08* (2013.01)

(58) Field of Classification Search
USPC .................................................. 370/329, 252
See application file for complete search history.

(56) References Cited

U.S. PATENT DOCUMENTS

| | | | |
|---|---|---|---|
| 2004/0081121 A1* | 4/2004 | Xu ................................ | 370/329 |
| 2009/0047971 A1* | 2/2009 | Fu ................................. | 455/450 |
| 2009/0190688 A1* | 7/2009 | Kotecha et al. ............... | 375/267 |
| 2010/0020702 A1* | 1/2010 | Wong et al. ................... | 370/252 |

* cited by examiner

*Primary Examiner* — Jason Mattis
(74) *Attorney, Agent, or Firm* — Rahman LLC

(57) ABSTRACT

An embodiment herein provides a method to mitigate effects of inter-cell interference in cellular communications, thereby maximizing SINR of a cellular device, due to a serving base station selecting a transmission strategy which places the signal strength (average and instantaneous) of the cellular device utilizing the base station in its in-phase region and inverse of interference signal strength (average and instantaneous) received by the cellular device from interfering base stations in their out-of phase region.

25 Claims, 5 Drawing Sheets

… (US 9,025,537 B2)

INTER-CELL INTERFERENCE MITIGATION USING LIMITED FEEDBACK IN CELLULAR NETWORKS

FIELD OF INVENTION

The embodiments herein generally relate to inter-cell interference mitigation, and, more particularly, to mitigation using beamforming angles/precoders used by base stations during their transmissions.

BACKGROUND AND PRIOR ART

Interference mitigation has been studied extensively in the context of CDMA systems. Here power control is employed to limit interference power, which is best understood as interference avoidance. Cellular capacity with spatially coloured interference, while employing multiple antennas is also well studied. Signal processing techniques such as successive interference cancellation, minimum-mean-square error combining, multiuser detection etc. are also available, which can cancel interference and is applicable for a broad category of systems employing wireless physical layer techniques like OFDM/OFDMA, SC-FDMA, CDMA, FDM/FDMA etc.

Interference avoidance can also be achieved through resource allocation methods such as sectorization, joint power allocation and channel-aware user scheduling. Another method to handle interference is to consider the links between several base stations (BS) and multiple users as a larger multi-input multi-output (MIMO) antenna system, over which the so-called centralized, multi-user beamforming or precoding can be performed. This is feasible when the channel state information (CSI) of the channels seen between the base stations and all interfering mobile terminals are available at a central controller, along with the multiple data streams to be transmitted to these terminals. Mitigating or minimizing the effect of interference adaptively maximizes the signal to noise interference ratio (SINR) and hence the rate. Full CSI feedback, as well as fast and tight inter-cell coordination, requires substantial communication resources, which is the price to pay for achieving the gains of multi-user beamforming.

Consider a case where link specific optimization is done to increase SINR of the subscriber station (SS). The natural tendency is to increase the transmitting power of the serving BS. However, this degrades SINR of the neighboring cells due to an increased interference power level. Though techniques like sectorization, user scheduling and other resource allocation techniques try to avoid this by reusing channels only at distant geographical locations, such that interference is minimized, it is a very limiting approach due to shrinking cell sizes and increasing demand for system capacity.

Consider BSs employing two transmit antennas. Using the Alamouti code, a code used to obtain diversity without losing on data rate in case of two transmit antennas, it can be seen that there is no improvement in signal strength due to the use of two antennas over the single transmit antenna for the SSs near the boundary of the cells.

SUMMARY OF INVENTION

In view of the foregoing, an embodiment herein provides a method to mitigate the effects of inter-cell interference in cellular communications, thereby maximizing SINR of a cellular device, due to a serving base station selecting a transmission strategy which places the signal strength (instantaneous and average) of the cellular device utilising the serving base station in its in-phase region and the inverse of interference signal strength (instantaneous and average) caused to cellular device(s) served by adjacent cell base stations in their out-of phase region; the method comprising the steps of a cellular device estimating channel from serving base station and interfering base stations; the cellular device calculating co-phasing angle(s) for all the channels seen from the base stations and constructing a vector of uniformly quantized values (precoding vectors) for each base station. The cellular device forwards said vectors to the serving base station and the serving base station forwarding these vectors to the corresponding interfering base stations; the serving base station deciding on a precoder; and the serving base station communicating the precoder to said cellular device.

It may be understood by those familiar in the subject that in a time division duplex (TDD) system, the reciprocity of the channel helps in identifying the precoder choice at the base stations to a larger extend, which avoids the need for the user to report preferred precoders/channel state information to the respective base stations.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments herein will be better understood from the following description with reference to the drawings, in which.

DESCRIPTION OF EMBODIMENTS

Figure 1:
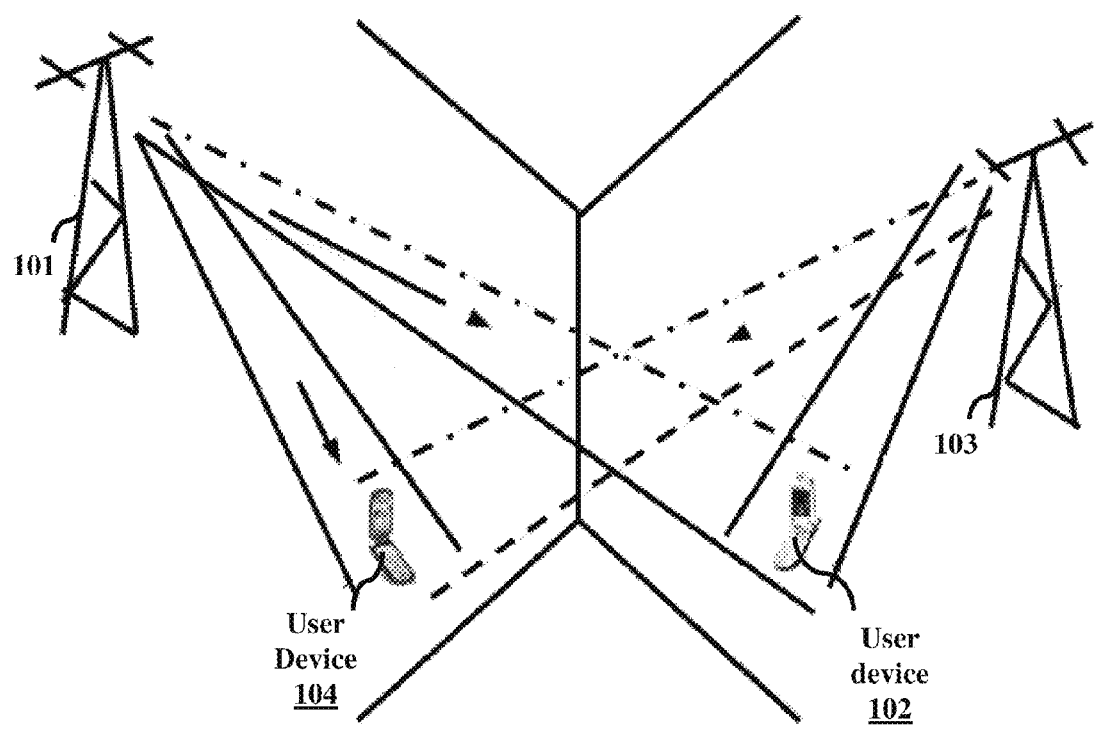
FIG. 1 illustrates inter-cell interference.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for inter-cell interference mitigation. The embodiments herein achieve this by providing a method for the base stations to choose a beamforming precoder, which can maximize the Signal-to-Interference-plus-noise ratio (SINR) or equivalently give the maximum gain at the user equipment in a distributed manner. Referring now to the drawings, and more particularly to FIGS. 1 through 5, where similar reference characters denote corresponding features consistently throughout the figures, there are shown preferred embodiments.

The embodiments described herein provide inter-cell interference mitigation wherein a wireless communication system consisting of N cell-sites with spectral resources are reused in each cell. When the interference power dominates over the variance of the Gaussian noise ($\sigma^2$) at the receiver, the link signal-to-interference ratio (SIR) can take the role of signal-to-interference plus noise ratio (SINR). It is assumed herein that every cell-site (or sector) has a base station (BS) of K antenna each. For illustrative purposes, the BSs described in here employ two antennas each. Further, it is assumed that the said BS serves a subscriber (SS) in the cell during a channel use wherein the said channel may be described as a time-frequency slot. The SSs can employ multiple antennas for communication. For illustrative purposes, the SSs described herein are assumed to employ one antenna each. Again for illustrative purposes, the BSs are assumed to employ a scalar precoder. In the general setup, there can be rotations and power level variations to the transmissions on each antenna element. The receiver equation for SS–i corresponding to the example given can now be given as follows, $$y_i = (h_{ii}^1 + e^{j\theta_i} h_{ii}^2) x_i^1 + \sum_{j=1, j \neq i}^{2} (h_{ji}^1 + e^{j\theta_j} h_{ji}^2) x_j^1$$

where $x_i^1$ and $x_i^2 (= e^{j\theta_i} x_i^1)$, are the symbols transmitted from both the antennas of BS–i.

The embodiments herein describe inter-cell interference mitigation of SSs wherein downlink signals of a SS from BS of the said SS interferes with the downlink signal of adjacent cell SSs, received from their respective BS, especially near the cell boundaries as shown in FIG. 1. FIG. 1 illustrates a two-cell interference model wherein SSs (102) and (104) are at the boundary of the cells. The BSs (101) and (103) comprising of two antennas each send signals to their respective SS which interferes with the SSs in the neighboring cell as illustrated in FIG. 1.

In other embodiments herein, one SS may be at the cell-edge, whereas the other SSs are inside the serving cell.

Figure 2:
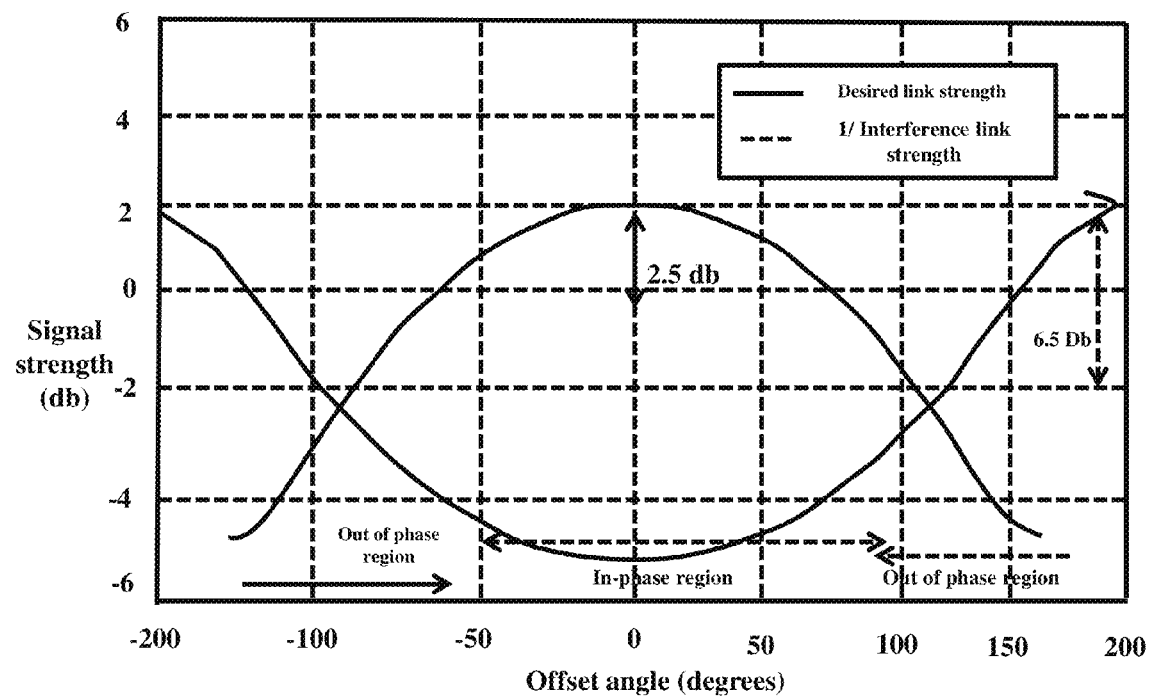
FIG. 2 illustrates the effect of beamforming angle on the SINR.

FIG. 2 illustrates the effect of the beamforming angle Θ on the SINR for the example in FIG. 1, with 2 antennas per base station and 1 antenna per user equipment. Curve (201) corresponds to average signal strength ($S_i$) wherein 1≤i≤N seen by SS–i; and curve (202) corresponds to average inverse of interference signal strength ($1/I_j$) wherein 1≤j≤N, i≠j, the interference caused to the SS from another cell which receives the downlink from its corresponding BS–j (herein referred to as co-channel user). The curves in FIG. 2 are shown for varying offset angle ($\overline{\Theta}_j$). In FIG. 2, curve (201) is referenced to the co-phased case wherein the value $\theta_o$ corresponds to $\theta_{ii}$=–arg ($h_{ii}^1 * h_{ii}^2$). The X-axis may correspond to any of the offset angles to any one of the precoders. In an example, the X-axis corresponds to offset angle $\overline{73}_j$ which corresponds to angle variation from the co-phasing angle of $SS_{-j}$, where the co-phasing angle is a precoder selected from the in-phase region. The beamforming angle which is the angle used for transmission by $BS_{-j}$ is:

$$\Theta_j = \overline{\Theta}_j + \theta_{jj}$$

The averaging is done over all realizations of $h_{ji}^k$ wherein $h_{ji}^k$ is the channel coefficient describing the frequency-flat channel between the kth antenna 1≤k≤K of the jth cell's BS to the ith cell's SS. The said h are modeled as complex Gaussian random variables with $E\{|h_{ji}^k|^2\}=1$. Further, it is assumed that said BS antennas are spaced sufficiently apart wherein $h_{ji}^k \in \{1, \ldots, K\}$ are statistically independent of each other.

In FIG. 2, consider an example, where the desired and the interference signals vary only by 2.5 dB in the in-phase region wherein $|\overline{\Theta}|<90°$; further, the variation of the desired and the interference signals is over 6.5 dB in the out-of-phase region wherein $|\overline{\Theta}|>90°$. The above mentioned figures are exemplary in nature and do not restrict the embodiments as disclosed herein in any manner. The gain due to network array (GNA), which is defined as the ratio of the array gain of the desired signal to the array gain of the interference signal of SS–1 is as shown below:

$$GNA_{1I} = \frac{E\{|h_{11}^1 + e^{j\theta_1} h_{11}^2|^2\}}{E\{|h_{21}^1 + e^{j\theta_2} h_{21}^2|^2\}}$$

According to an embodiment herein, the BSs can choose the beamforming angle wherein to minimize interference signal strength to the SS of the co-channel cell.

Further in an embodiment herein values of the beamforming angle is chosen wherein the BS places $S_i$ of its own SS in the in-phase region and $1/I_j$ of its co-channel SS in the out-of-phase region.

The in-phase region is defined by a set of precoders, which combine the channel links and thereby increase the SINR. The precoder can be an angle (in case of 2 transmit antennas), a vector of angles (multiple transmitting antennas), or a matrix of angles (2 or more transmitting antennas and 2 or more transmission streams). The set of precoders comprises of the set of all in-phase precoders and the set of all out-of-phase precoders. In an example, the in-phase precoders are also known as beam forming angles or co-phasing angles and the out-of-phase precoders are also known as beam canceling angles. The entries in the precoding matrix can also have different power levels, if needed. The selection of precoders affects the performance of the receiver. The user terminal prefers a precoder which gives the maximum gain after receiver processing, and indicates the base station of this choice. The selection of a wrong precoder can result in the performance of the receiver degrading. The set of precoders may also be referred to as the codebook.

Figure 3:
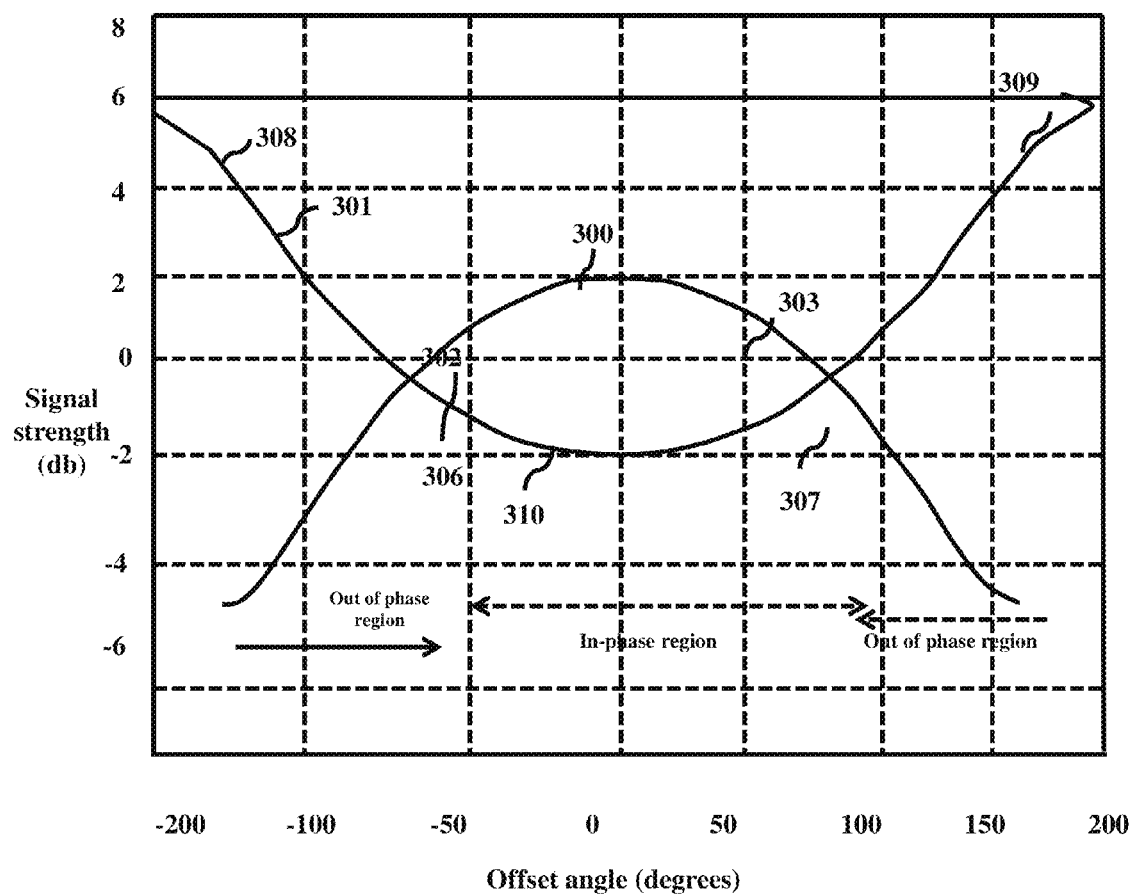
FIG. 3 illustrates an example of the embodiment for the selection of the beamforming angles.

FIG. 3 illustrates an example of an embodiment for selection of beamforming angles in the 2 transmit antenna case, wherein the signal from $BS_{-i}$ to $SS_{-i}$ is co-phased. In the example illustrated in FIG. 3, consider the case of two transmit antennas, the choice of angles $\Theta_1$ and $\Theta_2$ is based on angles $\theta_{11}$, $\theta_{12}$, $\theta_{21}$ and $\theta_{22}$ (where $\theta_{ji}$=–arg($h_{ji}^1 * h_{ji}^2$)) as referenced by (302), (301), (309) and (303) respectively. It may be noted that, the choice of angle mentioned in here (precoder) is just one particular method of arriving at precoding angles (used for illustrative purposes). In FIG. 3, curve (300) corresponds to average signal strength ($S_i$) wherein 1≤i≤N; and curve (310) corresponds to average inverse of interference signal strength ($1/I_j$) caused to co-channel user $SS_{-j}$, wherein 1≤j≤N, i≠j.

In FIG. 3, $\theta_{21}$ leads $\theta_{22}$ by 120° and $\theta_{12}$ lags behind $\theta_{11}$ by 60°. The angles of $BS_{-1}$ represented by (303) and (309) moves along curves (300) and (310) along X-axis by an amount $\Theta_1$ as shown in FIG. 3.

In FIG. 3 $\Theta_1=\theta_{11}$–90°, which results in (302) moving towards the boundary of the in-phase and out-of-phase region, wherein maximum interference reduction can be achieved. Further in FIG. 3, second base station BS–2 can employ a beamforming angle of $\Theta_2$ wherein $\Theta_2=\theta_{22}+60°$ which results in angle $\theta_{21}$ moving to the center of the out-of-phase region resulting in maximum gain due to interference reduction. It may be noted that a curve tracing based approach as depicted in FIG. 3, is only possible with a 2 transmit antenna case. In the general framework, the characterization of precoder choice for serving and interfering base stations can be difficult, and relies entirely on the receiver metric this need to optimize.

In the embodiment, value of $\Theta_i$ enables diversity reception of the signals wherein $\overline{\Theta}_1 = \theta_{ii} + \Theta_i$ is in in-phase region. In FIG. 3, the value of $\Theta$ is in the region (306,307). Further, value of said $\Theta_1$ enables to minimize the interference of the signal wherein $\theta_{ij} + \overline{\Theta}_i$ is in the out-of-phase region. In FIG. 3 value of $\theta_{ij} + \overline{\Theta}_1$ is close to points (308) or (309). The maximum gain described hereinabove can be achieved by employing selection of channels as described herein.

In an embodiment of the invention an adaptive transmission strategy at BSs employing multiple transmit antennas through cooperation amongst interfering cells wherein BSs exchange minimal feedback information of channel state obtained from user terminals is described. Further, in said embodiment the numerator and denominator terms in the GNA expression is improved wherein the sum SINR value is maximized.

The signal-to-interference-and-noise ratio defined in this embodiment refers to the ratio of desired signal strength to the sum of interference signal strengths and the thermal noise at the receiver. In the presence of a receiver processing algorithm, this corresponds to the ratio of desired signal strength to the unwanted signal strength. The choice of precoder design, channel coding and receiver algorithm is to maximize the ratio of the desired signal strength to the strength of the undesired signal components, either by maximizing the desired signal component, removing the undesired component or a combination, thereof.

In this embodiment, $\Theta_1$ is selected using quantized channel phase information wherein SS–i estimates the channel from serving BS, $h_{ii}^k$ and interfering BSs, $(h_{ji}^k, i \neq j)$. The numbers of possible values of quantized angles for l-bit quantization are given by $2^l$ wherein one value can be used for co-phasing the channels; further, $2^{(l-1)}$ of these entries are co-phasing angles wherein said co-phasing angles are in-phase. Further, entries remaining after co-phasing angles are chosen as canceling angles which result in loss of signal strength wherein canceling angles are out-of-phase.

Further, in this embodiment, a vector of uniformly quantized values $\hat{\theta}_{ji}$ is constructed according to received signal strength. In an example of embodiment $\hat{\theta}_{ji}$ values are arranged in decreasing order of received signal strength for each BS–j by each SS. Said SS forwards said vectors to serving base station ($BS_{-i}$). Said base station ($BS_{-i}$) retains its own vector $\hat{\theta}_{ii}$, forwards the interference precoding vectors $\hat{\theta}_{ji}$, j∈ {1, . . . , N}, j≠i to interfering BS ($BS_{-j}$). The interference vectors are sent to interfering BS using a network wherein the network can include but is not limited to a back-haul network or an over the air feedback means.

Further, in this embodiment, $BS_{-i}$ decides the value for $\Theta_i$ wherein vectors $\theta_{ji}$ are available. The said value for $\Theta_i$ is decided by the said BS such that SS in its cell ($BS_{-i}$) can receive signal with diversity by having its transmission in the in-phase region. Further, said value of $\Theta_i$ is decided by said BS such that interference caused to other cell SSs ($SS_{-j}$) which receive downlink from base stations $BS_{-j}$ is lowered.

Further, in this embodiment, prior to decoding, $SS_A$ is sent value of $\Theta_i$ for equalizing. The transmission of said value of $\Theta_i$ to the said SS ($SS_{-i}$) can include but is not limited to explicit feed forward transmission.

Figure 4:
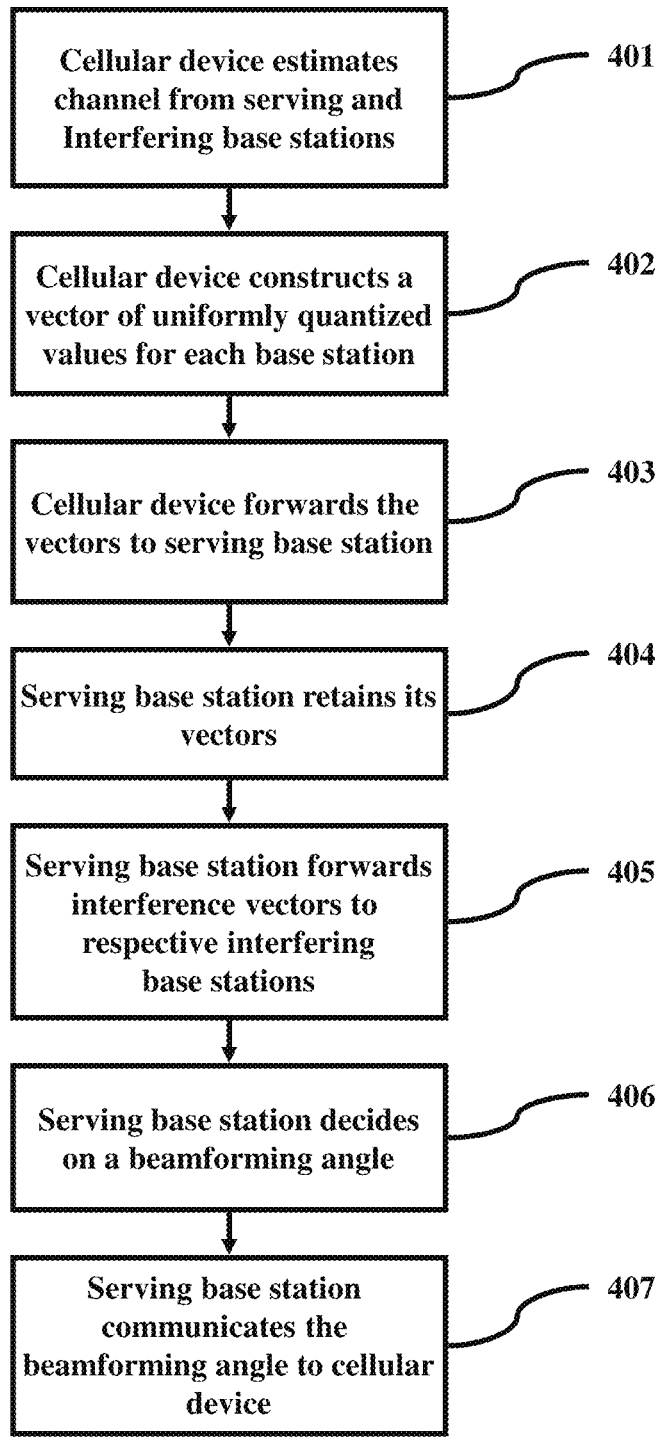
FIG. 4 is a flowchart wherein a method of execution of the embodiment is shown.

FIG. 4 is a flowchart wherein a method of execution of the embodiment is shown. The cellular device, SS–i estimates channel from serving BS ($BS_{-i}$) and interfering base stations ($BS_{-i}$) (401) and constructs a vector of uniformly quantized values for each base station (402) and forwards said vector to serving base station ($BS_{-i}$) (403). Said base station ($BS_{-i}$) retains its vector (404) and forwards the precoding vectors to respective interfering base stations ($BS_{-j}$) (405). Said $BS_A$ decides a precoder ($\Theta_i$) (406) and further forwards said precoder to the said device ($SS_{-i}$) (407).

Further, for the example given above, said transmission can include using pilots to help the said SS in channel estimation wherein pilots enable said $SS_{-i}$ to estimate combined channel $h_{ii}^1 + e^{j\Theta_i} h_{ii}^2$. Further, only one element of the vector wherein said element is a value which best co-phases signal from BS-i to SS–i is fed back wherein said vector is ordered as described hereinabove. Further, the information of the order of the elements including but not limited to decreasing order is fed back to said SS (SS–i) using a bit which indicates order of elements. The said feedback uses l+1 bits for feedback.

The two-user cooperation can be stated as shown in an algorithm as shown below wherein the quantized information is available to BSs. Said algorithm is based on relative channel phase and can obtain improvements to the array-gain.

---

1. Base Station Cooperation

---

1:  for all i such that i ∈ κ do
2:     $UE_i$ identifies $BS_j$, j ∈ $S_i$
3:     $UE_i$ estimates $H_{ij}$, j ∈ {i, $S_i$}
4:     $UE_i$ computes $l_{ij}$, j ∈ {i, $S_i$}
5:     $UE_i$ forwards the $l_{ij}$s on-air to $BS_i$
6:  end for
7:  $BS_i$ retains $l_{ii}$ and forwards $l_{ij}$, j ∈ $S_i$ to $BS_j$, through the back-haul network.
8:  $BS_k$ serving {cell-edge} $UE_k$ chooses $V^{\{l_{kk}^{(1)}\}}$ for precoding its transmission to $UE_k$
9:  $BS_j$, j ∈ $S_k$ arrives at an optimal value $V^{\{r_0\}}$ for {in-cell} $UE_j$ using the relation $$l_0 := \underset{f}{\operatorname{argmin}}\ l_{jj}^{(f)} = \underset{c}{\operatorname{argmax}}\ l_{kj}^{(c)}, \text{ with } f, c \in \{1, 2, \ldots, 2^{|v|}\}$$

---

The algorithm defined above captures the protocol to be followed. Every UE does a identification of the serving BS and of other BSs, nearby (possibly for handover purposes or other). The UEs estimate the channel for all these base stations. The UEs then parameterize the channel based on their capabilities and code them into a vector ($l_{ij}$), for the (i, j)'th link (i'th UE for the j'th BS). Parameterization does not limit the quality and quantity of the information being represented and exchanged.

The UEs then forward this information to the BSs. This information can be transferred from the UE to the serving BS and then to the interfering BSs, or the UE can communicate to all BSs using a broadcast channel mode. In case the UE communicates to the serving BS and then to the interfering BS, then it can be using a backhaul link, or can be through proprietary links defined as part of the system, when many BSs form part of a larger BS, with a central controller. The quality and quantity of the feedback involved can be a parameter of the system.

The serving BS and interfering BSs use this information to help enhance the SINR at the UE. The interfering BSs can either help minimize the interference to the UE or help balance the performance of this UE with the performance of the UE being served by the interfering BS. While there can be no restriction on the way this information needs to be used, the UE performance depends on how the feedback information is used in all these BSs. An optimal usage of this algorithm will be part of the BS implementation.

The $BS_{-i}$ tries to identify the element in the vector which matches with the interest of the $SS_{-i}$ and of $SS_{-j}$ wherein the matching is started from the right most entry of quantization vector $\hat{\theta}_{ij}$ (received from $SS_{-j}$) which is most interference canceling angle and from the left most entry of $\hat{\theta}_{ii}$ (received from $SS_{-i}$), the most co-phasing angle. Said matching of the interest of said SS by BS matches any value from first half of order of vectors wherein the left-most is the most preferred value. Said iteration is repeated until a match is found or until the $2^{(l-1)}$th value is reached, which is a match. In the event of a match of the value between $\hat{\theta}_{ij}$ and $\hat{\theta}_{ii}$ (which cancels much interference but still co-phases for $SS_{-i}$ as described above), the matching value is decided as the favorable value $\Theta_i$.

While the preferred embodiment is described for two user cooperation, it will be understood by those skilled in the art that said embodiment can be extended to include more than two users without departing from the spirit and scope of the embodiment.

While the preferred embodiment is described for two cells, it will be understood by those skilled in the art that said embodiment can be extended to include more than two cells without departing from the spirit and scope of the embodiment.

While the preferred embodiment is described with two antennas at the base station, it will be understood by those skilled in the art that said embodiment can be extended to include more than two antennas at the base station without departing from the spirit and scope of the embodiment.

While the preferred embodiment does not mandate the usage of any receiver processing technique at the subscriber terminal, it will be understood by those skilled in the art that said embodiment can be extended to include any receiver processing techniques as well.

Further, in embodiment, a scheduler can be used wherein said scheduler can be used in conjunction with described algorithm for optimal allocation of spectrum to SSs in the cell. The available spectrum can be loaded optimally in all cells wherein selection of best bands from interference point can be first done for co-channel cell-edge users. The users at cell boundary can also be assigned frequency bands by said scheduler based on $\theta_{ji}$ values for said bands from all SSs wherein $\theta_{ji}$ values for all bands from all co-channel users can be estimated preferably using the method of transmitting the pilot bits as described hereinabove.

While the preferred embodiment discusses the possibility of the user equipment feeding a vector parameterizing the channel for the serving and interfering basestations, it will be understood by those skilled in the art that the disclosed embodiment will work in the presence of a scheduler using only the choice of interfering vector needed, with a slight degradation in performance, however with a slight reduction in feedback.

Further, in accordance with various embodiments the array gain achieved can be improved further by using information on relative channel strengths wherein said information can be in the form of a single bit wherein said single bit indicates $h_{ji}^1 \lessgtr h_{ji}^2$. The equation for the receiver ($SS_{-i}$) for two transmitting antennas, wherein path loss is normalized can be given as shown below:

$$y_i = (h_{ii}^1 + e^{j\vartheta_i} h_{ii}^2)x_i^1 + \sum_{j=1, j \neq i}^{2} (h_{ji}^1 + e^{j\vartheta_j} h_{ji}^2)x_j^1$$

In the above mentioned equation, the coefficients of $h_{ii}$ and $h_{ji}$ are the power levels (the different power levels used in the above equation are 1, $e^{j\overline{\Theta}_i}$ and $e^{j\overline{\Theta}_j}$). The relative phase between channel parameters of channels from two BSs transmit antennas to single terminal receive antenna is available at BS; further equal power transmission is performed wherein $x_j^2 = e^{j\overline{\Theta}_j} x_j^1$. In the above equation wherein two channels have different channel strengths, first antenna of $BS_{-j}$ transmits $\alpha_j x_j^1$ wherein $\alpha_j$ is the power level employed by said base station antenna; second antenna transmits $\sqrt{1-\alpha_j^2} e^{j\overline{\Theta}_j} x_j^1$ wherein $\sqrt{1-\alpha_j^2}$ is the power level of said antenna. In the above mentioned parameters, $x_j^k$ corresponds to complex baseband symbols transmitted from antenna k of BS-j and beam forming angle is given by $\Theta = \overline{\Theta}_j + \theta_{ji}$. The equation for the receiver as mentioned above can be written as:

$$y_i = (\alpha h_{ii}^1 + \sqrt{1-\alpha^2} e^{j\vartheta_i} h_{ii}^2)x_i^1 + \sum_{j=1, j \neq i}^{2} (\alpha h_{ji}^1 + \sqrt{1-\alpha^2} e^{j\vartheta_j} h_{ji}^2)x_j^1$$

The GNA of SS-1 is given as shown in equation below:

$$GNA_{1SI_P} = \frac{E\{\|\alpha h_{11}^1 + \sqrt{1-\alpha^2} e^{j\vartheta_1} h_{11}^2\|^2\}}{E\{\|\alpha h_{21}^1 + \sqrt{1-\alpha^2} e^{j\vartheta_2} h_{21}^2\|^2\}}$$

In the above equation, $\Phi$ denotes either the numerator or denominator wherein the subscript is removed:

$$\Phi = \|\alpha h_{ji}^1 + \sqrt{1-\alpha^2} e^{j\overline{\Theta}_j} h_{ji}^2\|^2 = \alpha^2 |h_{ji}^1|^2 + (1-\alpha^2)|h_{ji}^2|^2 + 2\cos(\overline{\Theta}_j)\alpha\sqrt{1-\alpha^2}|_{ji}^1\|h_{ji}^2|$$

wherein $|h_{ji}^k| \sim \text{Ray}(\frac{1}{2})$, $k \in \{1,2\}$ is Rayleigh distributed.

The value of GNA of SS-1 in the equation above can be increased by altering numerator or denominator of said equation wherein relative channel strength information available as a single bit of information is used. The signal components can be altered by transmitting on the antenna corresponding to the stronger channel with relatively more power and interfering component can be altered by transmitting on the antenna corresponding to weaker channel with relatively more power. The above mentioned equation for $\Phi$ can be modified and given as shown below:

$$\Phi = \alpha^2 h_u^2 + (1-\alpha^2)h_l^2 + 2\cos(\overline{\Theta}_j)\alpha\sqrt{1-\alpha^2}h_u h_l$$

wherein;

$h_u = \max(|h_{ji}^1|, |h_{ji}^2|)$ $h_l = \min(|h_{ji}^1|, |h_{ji}^2|)$

Further, power level used on stronger link antenna is represented by $\alpha^2$ and the power levels used in the weaker link antenna be represented by $1-\alpha_j^2$.

The optimal value of $\alpha^2$ can be calculated by taking mean value of above mentioned equation for $\Phi$ and solving for the below equation:

$$\frac{dE[\Phi]}{d\alpha} = 0$$

The optimal value of $\alpha^2$ which is calculated above is given by:

$$\alpha^2 = \frac{1}{2} \pm \frac{1}{\sqrt{\pi^2 \cos(\tilde{\partial}_j)^2 + 4}}$$

wherein $h_f \sim \text{Ray}(\frac{1}{4})$ and $h_u \sim 2\text{Ray}(\frac{1}{2}) - \text{Ray}(\frac{1}{4})$
Further, it can be shown that $h_u h_f = |h_1| \|h_2|$.

Figure 5:
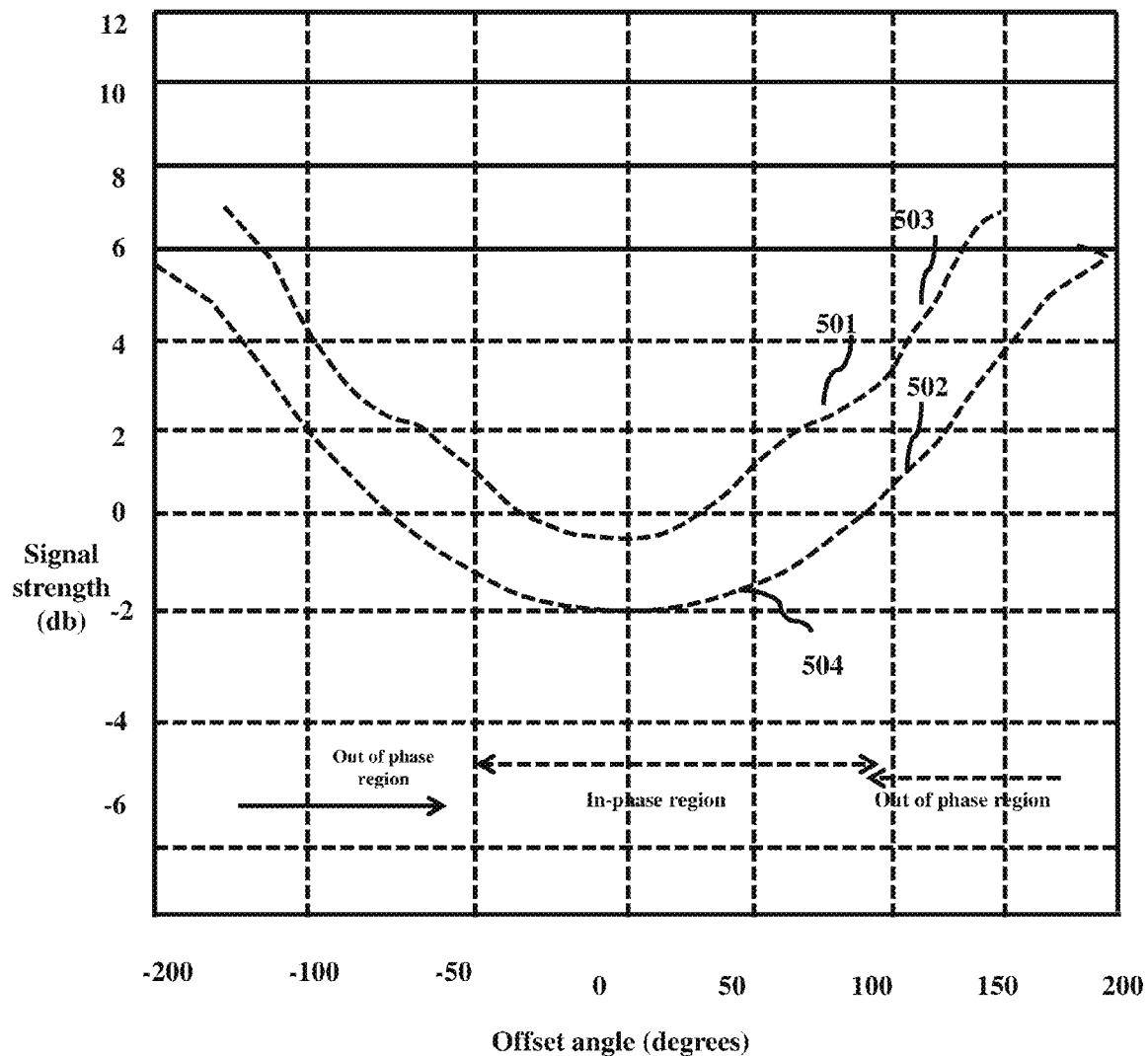
FIG. 5 is illustrates the single bit feedback on the relative signal strength to control power.

FIG. 5 illustrates the single bit feedback on the relative signal strength to control power wherein the interference can be minimized. Curve (502) represents $S_i$ with no power control and (501) represents said $S_i$ with power control. Further, (504) represents $1/I_i$ with no power control and (503) represents the said $1/I_i$ with power control.

Embodiments as disclosed above can be used in case of multiple secondary base stations connected to a primary base station, wherein each secondary base station considers other secondary base stations as interfering base stations and communication between the secondary base stations occurs through the primary base station. Here, the primary base station controls the secondary base stations, which do not have any in-built intelligence.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method to mitigate effects of inter-cell interference in a cellular communication system, by maximizing a Signal to Interference plus Noise Ratio (SINR), wherein a serving base station selects a transmission strategy which places average signal strength of a cellular device utilizing said serving base station in in-phase region and average inverse of interference signal strength received by said cellular device from one or more interfering base stations in out-of phase region; said method comprising:
   estimating channel state information from said serving base station and said one or more interfering base stations by said cellular device;
   employing a plurality of precoders for said serving base station and said one or more interfering base stations by said cellular device;
   constructing a precoder vector from said plurality of precoders based on a receiver metric for said serving base station by said cellular device;
   constructing a plurality of interference precoder vectors from said plurality of precoders based on said receiver metric for each of said one or more interfering base stations by said cellular device;
   receiving said precoder vector and said plurality of interference precoder vectors constructed from said plurality of precoders from said cellular device at said serving base station;
   forwarding said plurality of interference precoder vectors to said one or more interfering base stations by said serving base station;
   selecting a set of precoders by said serving base station based on received said precoder vector and received said interference precoder vectors;
   deciding a precoder from said selected set of precoders for said serving base station by said serving base station for transmission of data to said cellular device; and
   communicating said precoder to said cellular device by said serving base station.

2. The method as claimed in claim 1, wherein said precoder vector and said interference precoder vectors are constructed by said cellular device in decreasing order of received signal strength for said serving base station and said one or more interfering base stations, wherein said precoder vector and said interference precoder vectors comprises a vector of uniformly quantized values related to channel state.

3. The method as claimed in claim 1, wherein said precoder vector and said interference precoder vectors are constructed by said cellular device in increasing order of received signal strength for said serving base station and said one or more interfering base stations, wherein said precoder vector and said interference precoder vectors comprises a vector of uniformly quantized values related to channel state.

4. The method as claimed in claim 1, wherein said serving base station forwards respective interference precoder vectors to said one or more interfering base stations through a backhaul network.

5. The method as claimed in claim 1, wherein said serving base station forwards respective said interference precoder vectors to said one or more interfering base stations through a connection means.

6. The method as claimed in claim 1, wherein said serving base station decides on said precoder by matching elements in said precoder vector from the left most entry and elements in said interference precoder vectors from the right most entry.

7. The method as claimed in claim 1, wherein said serving base station communicates said precoder to said cellular device through an explicit feed forward transmission.

8. The method as claimed in claim 1, wherein said serving base station communicates said precoder to said cellular device using pilots.

9. The method as claimed in claim 1, when said SINR experienced by said cellular device is below a prescribed threshold, said cellular device is categorized as interference limited cellular device.

10. The method as claimed in claim 1, when said SINR experienced by said cellular device is above said prescribed threshold, said cellular device is categorized as noise limited cellular device.

11. The method as claimed in claim 1, wherein said selected set of precoders are optimized by a scheduler at a controller for optimal allocation of spectrum to a plurality of cellular devices, residing within a cell.

12. The method as claimed in claim 11, wherein said controller schedules said plurality of cellular devices based on SINR values, wherein each of said plurality of cellular devices with a low SINR value are scheduled prior to each of said plurality of cellular devices with a high SINR value.

13. The method as claimed in claim 1, wherein said method for interference mitigation comprises identifying a set of precoders based on feedback of a plurality of entries in a codebook fed back from said cellular devices.

14. The method as claimed in claim 1, wherein said selected set of precoders are optimized by one of a centralized controller or a distributed controller for interference mitigation.

15. A cellular device comprising:
  means for estimating channel state information from a serving base station and one or more interfering base stations;
  means for employing a plurality of precoders for said serving base station and said one or more interfering base stations;
  means for constructing a precoder vector from said plurality of precoders based on a receiver metric for said serving base station;
  means for constructing a plurality of interference precoder vectors from said plurality of precoders based on said receiver metric for each of the said one or more interfering base stations; and
  means for forwarding said precoder vector and said plurality of interference precoder vectors constructed from said plurality of precoders to said serving base station.

16. The cellular device as claimed in claim 15, wherein said cellular device is further configured to construct said precoder vector and said interference precoder vectors in decreasing order of received signal strength, for said serving base station and said one or more interfering base stations, wherein said precoder vector and said interference precoder vectors comprises a vector of uniformly quantized values related to channel state.

17. A serving base station connected to at least one cellular device wherein said serving base station comprises:
  means for receiving from a cellular device a precoder vector and a plurality of interference precoder vectors constructed from a plurality of precoders;
  means for forwarding said plurality of interference precoder vectors to respective one or more interfering base stations;
  means for selecting a set of precoders based on received said precoder vector and said interference precoder vectors;
  means for deciding a precoder from said selected set of precoders for said serving base station and said one or more interfering base stations by said serving base station for transmission of data to said cellular device; and
  means for communicating said precoder to said cellular device.

18. The base station as claimed in claim 17, wherein said serving base station is further configured to forward said interference precoder vectors to said interfering base stations through a backhaul network.

19. The base station as claimed in claim 17, wherein said serving base station is further configured to decide on said precoder by matching elements in said precoder vector from left most entry and said one or more interference precoder vectors from right most entry.

20. The base station as claimed in claim 17, where said serving base station is further configured to communicate said precoder to said cellular device through an explicit feed forward transmission.

21. The base station as claimed in claim 17, where said serving base station is further configured to communicate said precoder to said cellular device using pilots.

22. A method to mitigate effects of inter-cell interference in cellular communications, said method comprising:
  identifying serving base station and one or more interfering base stations by a cellular device;
  estimating channel state information for said serving base station and said one or more interfering base stations by said cellular device;
  employing a plurality of precoders by said cellular device;
  computing a receiver metric for entries in a code book using said estimated channel state information by said cellular device for said serving base station and said one or more interfering base stations;
  sorting said code book entries by said cellular device based on said receiver metric computed;
  forwarding said sorted code book entries to said serving base station by said cellular device, wherein said sorted code book entries correspond to said serving base station;
  forwarding respective sorted code book entries belonging to said one or more interfering base stations by said serving base station, wherein said respective sorted code book entries correspond to said one or more interfering base stations;
  deciding on a precoder by said serving base station based on said received sorted code book entries;
  employing said precoder for transmission of data to said cellular device by said base station; and
  communicating the said precoder to said cellular device by said serving base station.

23. The method as claimed in claim 22, wherein said cellular device is further configured to sort said code book entries based on said receiver metric computed in descending order.

24. The method as claimed in claim 22, wherein said serving base station forwards said code book entries to said interfering base stations through a backhaul network.

25. The method as claimed in claim 22, wherein said method further comprises:
  contacting at least one of said interfering base stations by said serving base station and requesting for cooperation for ensuring that inter-cell interference is mitigated to said cellular device being served by said serving base station.

* * * * *